No. 854,909. PATENTED MAY 28, 1907.
C. L. POLK.
PLOW ATTACHMENT.
APPLICATION FILED APR. 5, 1907.

Calvin L. Polk
Inventor

Witnesses
Arthur Wesley
M. A. Schmidt

By M. B. Swornoski
Attorney

UNITED STATES PATENT OFFICE.

CALVIN LUCIOUS POLK, OF MARLIN, TEXAS.

PLOW ATTACHMENT.

No. 854,909.  Specification of Letters Patent.  Patented May 28, 1907.

Application filed April 5, 1907. Serial No. 366,509.

*To all whom it may concern:*

Be it known that I, CALVIN LUCIOUS POLK, a citizen of the United States, residing at Marlin, in the county of Falls and State of Texas, have invented certain new and useful Improvements in Plow Attachments, of which the following is a specification.

This invention is an attachment for shovel-plows for regulating the depth thereof, and has for its object an attachment of this kind which is simple in construction and easy to operate.

Figure 1:
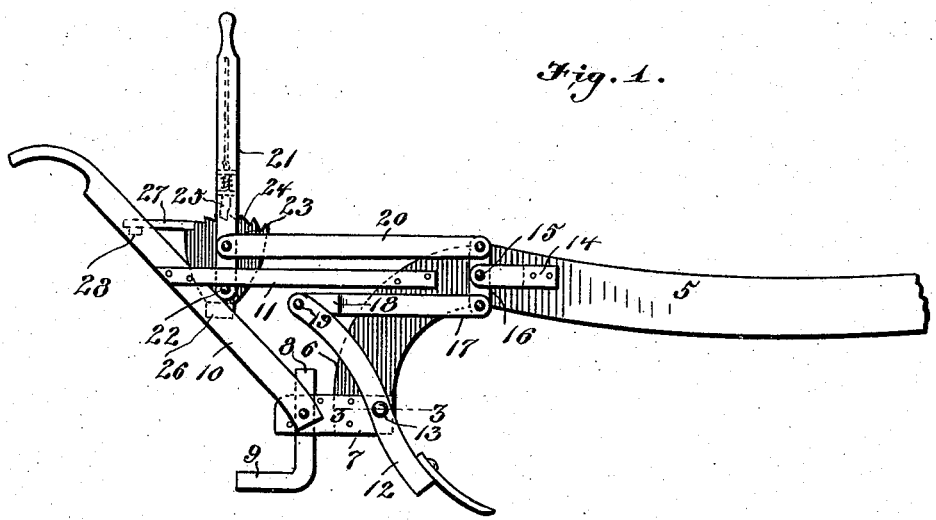
Figure 2:
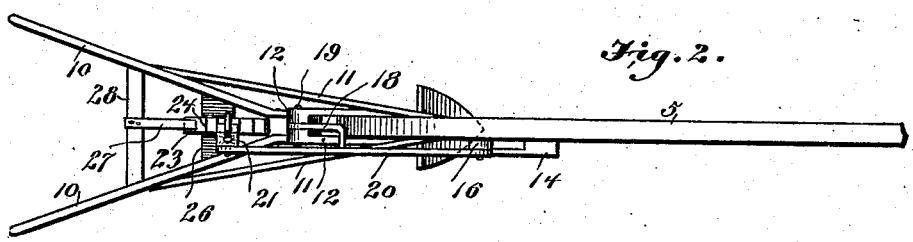
Figure 3:
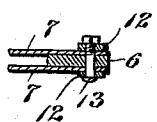

In the accompanying drawing, Figure 1 is a side elevation of a plow showing the application of the invention. Fig. 2 is a top plan view. Fig. 3 is a vertical section on the line 3—3 of Fig. 1.

Referring specifically to the drawing, 5 denotes the plow-beam, the rear end of which is downwardly curved as indicated at 6. To the foot of the beam, on opposite sides thereof are bolted or otherwise secured rearwardly extending plates 7 between which is clamped the shank 8 of guide-shoe 9. The sides of the beam are recessed to receive the plates 7 so that they may extend flush therewith. The lower ends of the handles 10 are fastened to the plates 7 and are also connected to the beam by braces 11.

The shovel standard comprises plates 12 arranged on opposite sides of the beam at the rear end thereof and pivotally connected thereto by means of a bolt 13 which extends through the beam and also through the plates 7. On one side of the beam is secured a bracket 14 between which and the beam is pivoted at 15 a lever 16, one end of which is connected by a link 17 to the upper end of the plates 12, said link having a laterally offset portion 18 which extends between the plates and is connected thereto by a transverse bolt 19. The other end of the lever 16 is connected by a link 20 to a hand-lever 21 which is pivoted at 22 to a segment 23 having a rack 24 which is engaged by a latch 25 carried by the hand-lever for locking the same. The segment is fastened to a plate 26 extending between and secured to the handles 10 and is also connected by a brace 27 to a cross-bar 28 extending between and secured to the handles.

In use, the shovel of the plow is raised or lowered by swinging the standard on its pivot 13 which is readily done by the lever 16. After the desired adjustment is made the lever is locked to the segment 23 whereby the shovel will be securely held in adjusted position.

The construction and arrangement of the parts herein described places the lever 16 close to the handles of the plow so as to be within easy reach of the operator by reason of which the adjustment can be readily made while the plow is in action without the operator leaving his position behind the handles.

I claim:—

1. The combination with a plow-beam and its handles, of a standard comprising plates arranged on opposite sides of the beam and pivotally connected thereto, a lever pivoted on one side of the beam, a hand-lever pivotally mounted between the handles, a link connecting one end of the first mentioned lever to the aforesaid plates, said link having a laterally offset portion entering between the plates and connected thereto, and a link connecting the other end of the said lever to the hand-lever.

2. The combination with a plow-beam and its handles, of a standard pivotally connected to the beam, a lever pivoted on one side of the beam, a plate extending between and secured to the handles behind the beam, a segment rack on the plate, a hand-lever pivoted to the segment rack and having a latch engageable therewith, and links connecting the ends of the first mentioned lever to the standard and the hand-lever, respectively.

In testimony whereof I affix my signature, in presence of two witnesses.

CALVIN LUCIOUS POLK.

Witnesses:
  W. E. ROGERS,
  S. O. JONES.